2,891,353
Patented June 23, 1959

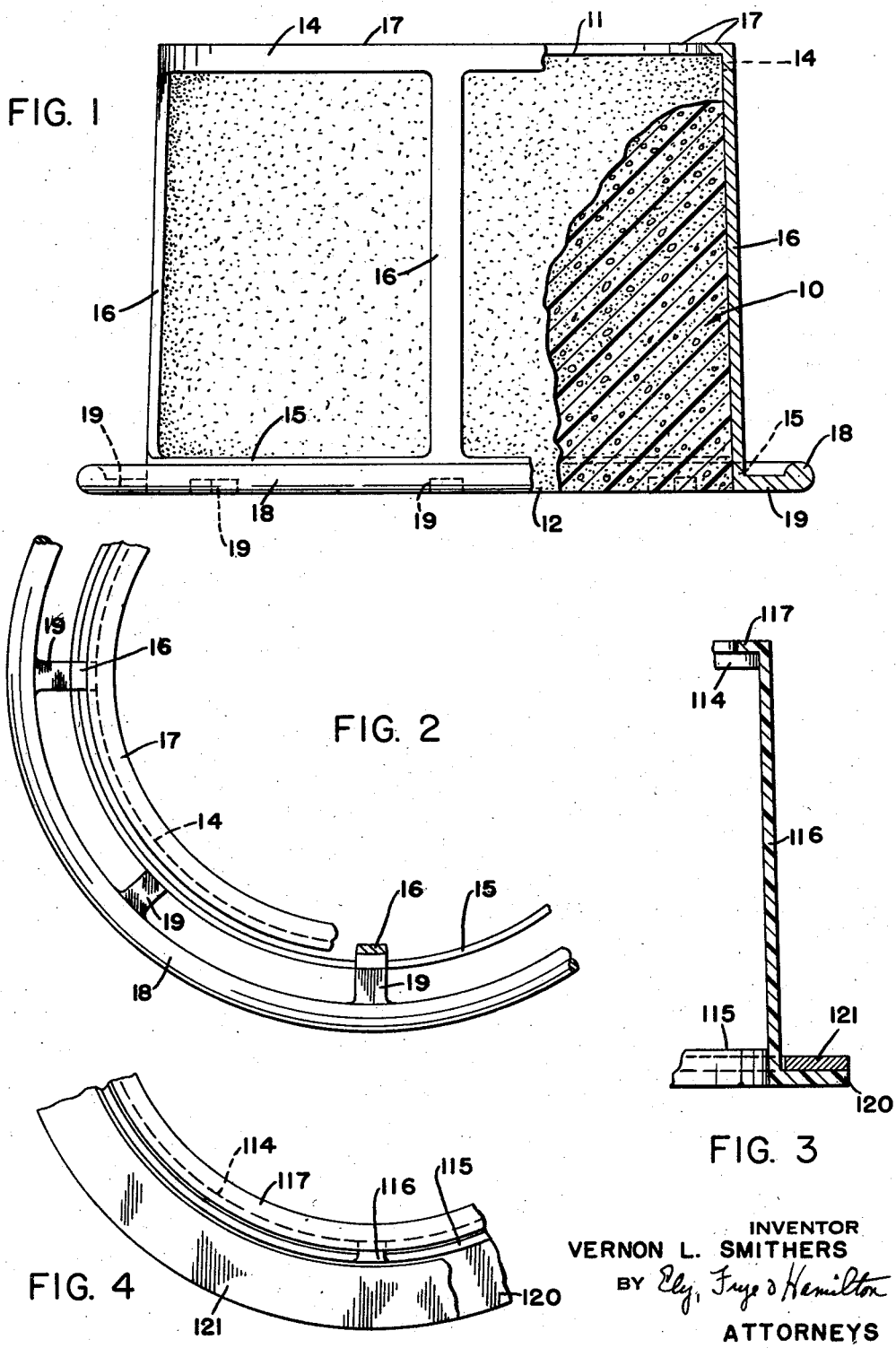

2,891,353

FLOWER HOLDER

Vernon L. Smithers, Akron, Ohio, assignor to The V. L. Smithers Manufacturing Company, Kent, Ohio, a corporation of Ohio Application June 26, 1956, Serial No. 593,990

3 Claims. (Cl. 47—41)

The invention relates generally to a device for supporting and displaying cut flowers in desired arrangements, and more particularly to an improved stable flower support having a body of absorbent foam which may be saturated with water for keeping the flowers fresh. The absorbent foam may be any of the well-known synthetic resins suitable for the purpose which have sufficient strength to retain the cut flowers in desired position.

Foams of this type are ordinarily very light in weight and a block of the foam is easily tilted or tipped over when used to support flowers having their stems stuck in the foam. Moreover, the foam is usually rather fragile and easily crushed at the edges in handling.

The present improvement provides a flower holder having a block of absorbent foam which is removably held in a cage of substantially rigid material, which, in addition to providing some protection for the block from crushing or breaking, also greatly increases its stability in supporting a number of flowers in a desired arrangement. Though substantially rigid, the cage is easily deformable to adapt its shape to various configurations. The construction of the cage is such that it may be placed in a stable position on a table top or hung on a wall, or provided with means of hanging from the ceiling; in other words, it provides a stable support for the block of foam in any and all positions.

The purpose of the invention is to provide an improved moisture-retaining foam flower holder which is portable without injuring the foam, self-supporting in substantially any position, has increased stability in holding the stems of cut flowers in any desired arrangement, and allows full accessibility to the foam.

While the novel flower holder is self-supporting, it is readily usable in an open dish or vase in place of the usual rigid mesh or needlepoint holders, in which case the spillable water usually present may be dispensed with if the foam is saturated with water.

It will be apparent that the improved flower holder can be made the basis for all sorts of flower arrangements in the home, centerpieces for the table, etc., because of its durability, portability and adaptability.

Other purposes of the invention will be suggested by the following detailed description. It is to be understood that various modifications and changes in details of construction are comprehended within the scope of the invention defined in the appended claims.

Preferred embodiments of the invention are shown by way of example in the accompanying drawings, in which Fig. 1 is a side elevation of one form of the improved holder, partly broken away and in section.

Fig. 2 is a fragmentary top plan view, partly in section, of the cage shown in Fig. 1.

Fig. 3 is a fragmentary vertical section of a modified form of cage.

Fig. 4 is a fragmentary plan view thereof.

The block of absorbent foam is indicated generally at 10 and is preferably substantially cylindrical in form with two parallel end faces 11 and 12.

The block 10 is composed of a synthetic resin in the form of a permanent foam made by blowing various types of organic resins, and particularly synthetic resins such as phenolic condensation products, of which phenol molding plastics known as "Bakelite" are an example. Other similar resins, which are adaptable to the foaming process and when subjected to heat will cure or set into a rigid form which is hydrophilic or water absorbent, may be used. Urea-formaldehyde foams have been employed.

The preferred type of foam is one which is composed of a great multitude of inter-connected cells so as to be highly hydrophilic, and phenolic foam is ideal for this purpose while the other foams referred to have this property in lesser degrees.

The ability of the usable foams to absorb water is greatly enhanced if the foam is treated with a wetting agent either before it is dipped in water or during the immersion. Many types of wetting agents are adaptable, that known as "Igepal CO-530" (alkyl phenoxy polyoxyethylene ethanol) being especially well adapted for the purpose. Polyglycol ether and the various alkyd-aryl sulfonates or artificial soaps may also be used.

The improvement of the present invention is a skeleton cage having substantially the configuration of a man's high crown silk hat, fitting closely around the block of foam and from which the block is easily removable. The cage is preferably made of a soft, heavy metal, such as lead or lead alloy, to give the flower holder increased weight and stability for supporting a flower arrangement in desired position, and to permit deforming the cage to fit various containers or to fit blocks of foam of varying shape. The design of the cage is ornamental as well as functional.

Referring to Figs. 1 and 2, the cage preferably comprises two parallel, spaced-apart rings or rim members 14 and 15 which are connected at intervals around their circumferences by ribs or bars 16. The ring 14 is designed to fit closely around the outer edge of the end face 11 of the block 10, and the ring 15 is designed to fit closely around the outer edge of end face 12, thus protecting the outer edges of the block. The ring 14 has an annular flange 17 overlying and abutting the marginal portion of end face 11 of the block to retain the block within the cage, and the ring 15 is open and unobstructed to allow insertion and removal of the block. The ribs 16 preferably are slightly tapered to facilitate withdrawing the cage from a casting mold, and this taper facilitates entering the block into the cage without crushing its outer edges.

Surrounding the ring 15 and spaced laterally outward therefrom is a base ring 18. The undersurface of the base ring is preferably in the same plane as the outer face of ring 15 so that it forms a flat and stable support for the cage when placed on a table top in the position shown in Fig. 1. The base ring may be attached to the ring 15 at intervals by connecting bars or spokes 19 and, as shown, some of the bars 19 may merge with the ends of connecting ribs 16. The annular spaces between the base ring 18 and the inner ring 15 provide convenient means for hanging the holder on a wall with the base ring abutting the same. The spokes provide means of attaching wires or other means for hanging the cage from the ceiling.

In order to facilitate casting the cage, the ring 15 may be omitted and the base ring connected directly to the ribs 16, without seriously impairing the usefulness of the cage.

The modified form of cage illustrated in Figs. 3 and 4, is preferably molded out of plastic material such as polyethylene, which is a tough, pliable, thermoplastic solid, which is unaffected by water and by a large range of chemicals including those composing the block 10. The cage has parallel, spaced-apart rings 114 and 115 connected at intervals by ribs 116. Ring 114 is provided with an annular retaining flange 117. The ring 115 is provided with an outturned annular flange 120, and a metal ring 121 is preferably secured to the inner surface of ring 120 to give the cage added weight and stability. Otherwise, the design and function of the plastic cage of Figs. 3 and 4 is the same as the metal cage of Figs. 1 and 2.

Accordingly, the improved flower holder provides ornamental and stable means for supporting a large variety of flower arrangements on a table or wall, or in suspended positions, while keeping the flowers fresh. The foam is supported by the cage and its edges are protected without interfering with the insertion of flowers in desired arrangements. The holder may be dipped in water without removing the block, and the block is subsequently easily removed and replaced so that the cage can be used again and again with new blocks inserted therein. The holder may be placed in an open dish or vase, and is easily deformable to fit different shapes of blocks as well as different shapes of dishes.

The improved holder is useful in designing and creating a large variety of flower arrangements for the table, including centerpieces and the like. It can be used as a base around which outer wrappings and decorative embellishments for the flowers in the holder can be built up as desired. For example, a candle may be easily inserted into the foam and a table centerpiece created around the whole device. This may be set in a dish containing some spillable water or wrapped with florist foil and the use of a container dispensed with.

What is claimed is:

1. A moisture-retaining flower holder for cut flowers comprising a substantially rigid skeleton cage of molded plastic material, a block of synthetic resin within and substantially conforming to said cage, the cage having a ring at one end overlying the block, and a heavy metal ring spaced laterally outward around the block and attached to the other end of the cage.

2. A moisture-retaining flower holder for cut flowers comprising a substantially rigid skeleton cage of molded plastic material, a block of synthetic resin within and substantially conforming to said cage, the cage having a ring at one end overlying the block and a ring at the other end surrounding and extending laterally outward from the block, and a ring of relatively heavy material attached to said laterally outward extending ring.

3. A moisture-retaining flower holder for cut flowers comprising a substantially rigid skeleton cage of deformable material, a block of hydrophilic synthetic resin fitting within said cage and conforming thereto, said cage having a rim flanged at one end overlying the block and a base ring at the other end positioned laterally outward of said cage and attached thereto by peripherally spaced bars.

References Cited in the file of this patent

UNITED STATES PATENTS

| | | |
|---|---|---|
| D. 26,106 | Douglass | Sept. 29, 1896 |
| 1,638,250 | Finlayson | Aug. 9, 1927 |
| 1,762,843 | Straub | June 10, 1930 |
| 2,307,286 | Matignon | Jan. 5, 1943 |
| 2,637,143 | Reynolds | May 5, 1953 |
| 2,753,277 | Smithers | July 3, 1956 |